Nov. 13, 1962  POSHENG YEN  3,063,544
CONVEYOR ASSEMBLY CONTROL SYSTEM
Filed May 9, 1961

INVENTOR
P. YEN
By A. J. Nugent
ATTORNEY

United States Patent Office 3,063,544
Patented Nov. 13, 1962

3,063,544
CONVEYOR ASSEMBLY CONTROL SYSTEM
Posheng Yen, New York, N.Y., assignor to Western Electric Company, Incorporated, New York, N.Y., a corporation of New York
Filed May 9, 1961, Ser. No. 108,935
10 Claims. (Cl. 198—37)

This invention relates to an improved electrical control system for use in controlling the flow of articles on a merged conveyor assembly to prevent jamming thereof.

An object of the invention is to provide a simple electrical control system for controlling the operation of a conveyor assembly which comprises a plurality of feed conveyors merging into a main conveyor, and which control system can be more economically fabricated than has heretofore been possible with the more complex systems previously employed.

Another object of this invention is to provide a control system of increased reliability, thus reducing time lost through the necessity of maintenance and repair, by employing therein a minimum of simple electrical components of proven dependability.

Further objects of the invention reside in the provision of a control system which can be readily prefabricated in a unit and find widespread application in effectively controlling the operation of a merged conveyor assembly, and which allows for increased flexibility of operation of such assembly by provision for the convenient overriding of the control system commands by an operator.

In general, the invention comprises an apparatus for controlling the operation of a merged conveyor assembly wherein two conveyors, one normally active and the other normally inactive, merge with a third conveyor. Sensing means are mounted adjacent the normally inactive of the two conveyors and adjacent the third conveyor, and are operative to detect accumulations of articles thereon. Control means, responsive to such detection by the sensing means, are provided to activate and deactivate the separate conveyors in a manner predetermined to insure rapid dissipation of such accumulations. A manually operated override provision is included to enable extended activation of the normally inactive of the two conveyors under unusual traffic conditions.

Figure 1:
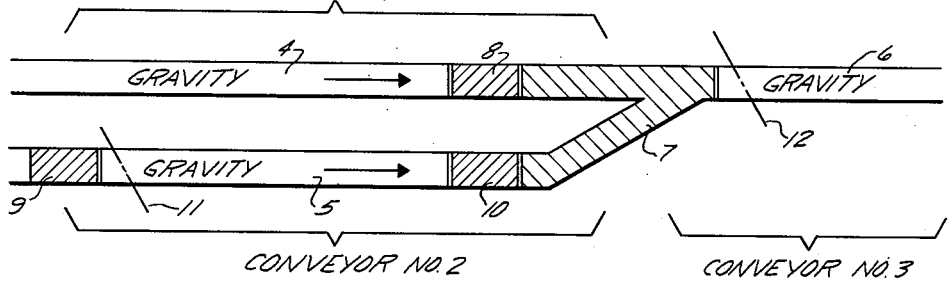
Figure 2:
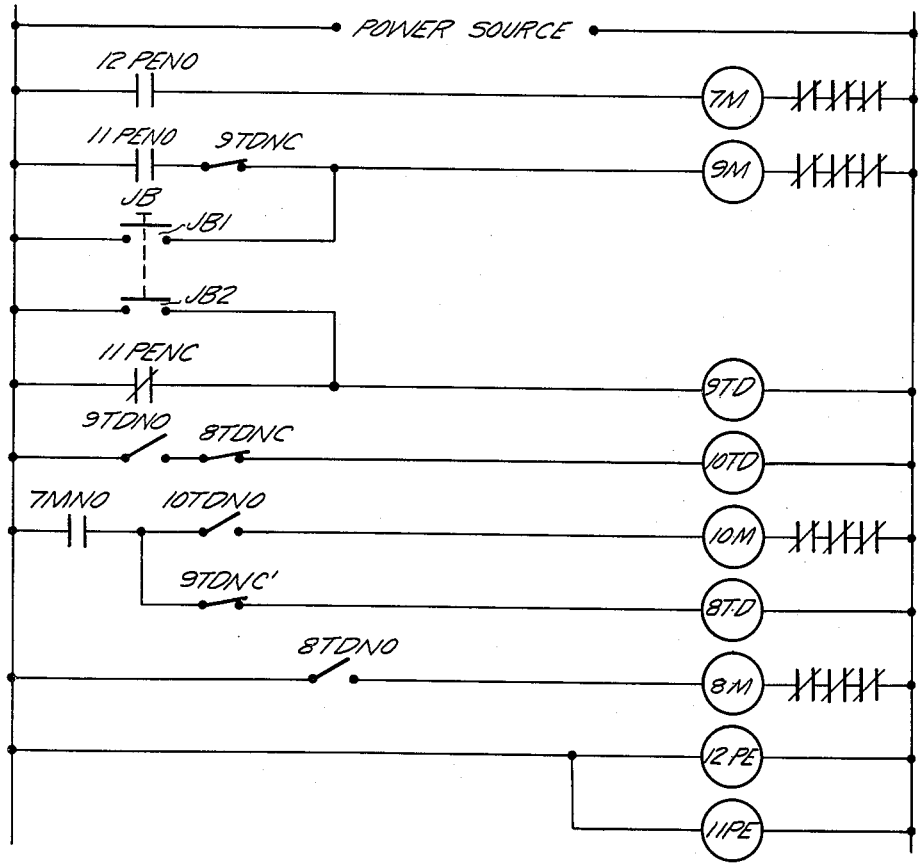

Other objects of the invention and the advantages thereof may be more fully understood by reference to the accompanying drawings, wherein:

FIG. 1 represents a merged conveyor assembly of the type to the control of which the invention is particularly adapted; and FIG. 2 shows diagrammatically a preferred embodiment of the electrical control system.

Referring now to FIG. 1, a merged conveyor assembly to be controlled is seen to comprise feed conveyors 1 and 2, and main conveyor 3, with each of such conveyors including a declined gravity section 4, 5, and 6, respectively, and along which declined gravity sections the articles to be conveyed move freely without requiring the provision of motive force. Motorized section 7 is located at the junction of the three conveyors and functions, upon activation, to transport articles from conveyors 1 or 2 to conveyor 3. Additionally, feed conveyor 1 includes motorized section 8 which functions upon activation to transport articles from gravity section 4 to motorized section 7. Similar motorized sections 9 and 10 are provided at opposite ends of gravity section 5 of conveyor 2. Motorized section 9 functions, upon activation, to transport articles to gravity section 5, while motorized section 10 functions, upon activation, to transport articles therefrom to motorized section 7. It is to be noted that each of the four motorized sections also functions, upon deactivation, to halt the flow of articles thereover. Thus, it is seen that the operation of the conveyor system and the transportation of articles thereover may be readily controlled by selective activation and/or deactivation of one or more of such motorized sections.

It is to this effect that photo-electric sensing means 11 and 12 are operatively positioned adjacent gravity sections 5 and 6, respectively, in such manner as to enable the beam of light from each of the sensing means to be interrupted for a predetermined period of time by an overly large accumulation or jam of articles on the gravity section adjacent thereto. A signal indicating the interruption of the beam of light is relayed to the electrical control circuit by the sensing means, at which point such circuit functions to activate and/or deactivate the appropriate motorized sections to effect a rapid dissipation of the jam in a manner more fully set forth hereinbelow.

Referring now to FIG. 2, the control circuit is seen to comprise motor control coils 7M, 8M, 9M, and 10M, each of which functions to activate and deactivate the correspondingly numbered motorized section. Motor controller coil 7M is seen to comprise normally open contacts 7MNO.

ON DELAY time delay relay 8TD, OFF DELAY time delay relay 9TD, and ON DELAY time delay relay 10TD are connected to the correspondingly numbered motor controller coils in the manner depicted, and include correspondingly numbered normally open contacts 8TDNO, 9TDNO, and 10TDNO, normally closed contacts 9TDNC and 9TDNC', and normally closed instantaneous contacts 8TDNC.

The time delay relays are designed in such manner that the ON DELAY time delay relay contacts shift, upon energization of the relay, only after a predetermined time delay, but function to reshift immediately after de-energization. Conversely, the OFF DELAY time delay relay contacts shift immediately upon energization of the relay, but reshift upon de-energization thereof, only after a predetermined time delay.

The circuit further comprises two photo-electric relays 11PE and 12PE, the operation of which is controlled by signals from the correspondingly numbered photo-electric sensing means, and which relays include normally open contacts 11PENO and 12PENO, and normally closed contacts 11PENC, which contacts shift as soon as power is applied to the circuit and require interruption of the light beam from the photo-electric sensing means before reshifting. The photo-electric relays include independent power sources 11PEP and 12PEP, as well as built-in time delays which prevent reshifting thereof until the light beam from the photo-electric sensing means has been interrupted for a predetermined period of time.

A manually operated jog button JB is included in the circuit as an override provision and comprises normally open contacts JB1 and JB2, which funtion upon closing to activate motorized section 9 and deactivate motorized section 8.

Operation

Upon the application of power to the circuit, both photo-electric relays 11PE and 12PE are immediately energized and close the associated normally open contacts 11PENO and 12PENO and open normally closed contacts 11PENC, resulting in the energization of motor controller coils 7M and 9M and corresponding activation of motorized sections 7 and 9.

Activation of 7M causes associated normally open contacts 7MNO to close, thus energizing ON DELAY time delay relay 8TD to close the associated normally open contacts 8TDNO after a predetermined time delay of one second. This results in the energization of motor controller coil 8M and corresponding activation of motorized section 8.

At this point, the motorized sections 7, 8, and 9 are running with articles flowing from gravity section 4 and motorized section 8 of conveyor 1 to motorized section 7 and gravity section 6 of conveyor 3. However, it is to be noted that articles are also flowing from motorized section 9 to gravity section 5 of conveyor 2 and accumulating on such conveyor by virtue of being halted by the inactive motorized section 10.

When this accumulation of articles on gravity section 5 builds up to the extent that the light beam from the photo-electric sensing means 11 is interrupted for a predetermined period of time, the normally open photoelectric relay contacts 11PENO reopen, thus de-energizing motor controller coil 9M which deactivates motorized section 9 to prevent a further accumulation of articles on this gravity section.

Normally closed contacts 11PENC also reshift and close, after the beam of light from the photo-electric sensing means has been interrupted for the predetermined period, to energize the OFF DELAY time delay relay 9TD. As soon as this relay is energized, the three contacts associated therewith shift with 9TDNC and 9TDNC' opening and 9TDNO closing. The closing of the normally open contacts 9TDNO functions to energize ON DELAY time delay relay 10TD which, in turn, effects the closing of normally open contacts 10TDNO after a predetermined time delay. This energizes motor controller 10M to activate motorized section 10. The opening of normally closed contacts 9TDNC functions to provide a predetermined time delay between the reclosing of photo-electric relay contacts 11PENO and the re-energization of motor controller coil 9M, while the opening of normally closed contacts 9TDNC' de-energizes ON DELAY time delay relay 9TD to immediately open normally open contacts 8TDNO which, in turn, effect a de-energization of motor controller coil 8M to deactivate motorized section 8.

The time delay inherent in the operation of OFF DELAY time delay relay 9TD is predetermined to equal the time which it will take the accumulation of articles built up on gravity section 5 of conveyor 2 to be moved therefrom onto motorized section 7 by motorized section 10. As soon as the last article has been moved out of the range of the beam of light from photo-electric sensing means 11, OFF DELAY time delay relay 9TD is de-energized because normally closed contacts 11PENC open immediately after such beam of light becomes uninterrupted once again.

This de-energization of OFF DELAY time delay relay 9TD does not cause the three contacts associated therewith to shift until the expiration of the built-in time delay equivalent to the time consumed by the accumulation of articles in clearing conveyor 2. However, upon expiration of this time delay, contacts 9TDNC, 9TDNC', and 9TDNO reshift with 9TDNC and 9TDNC' closing and 9TDNO opening. Thus the conveyor system returns to normal operation with motorized sections 7, 8, and 9 activated and motorized section 10 deactivated.

In the event of a sudden influx of articles on conveyor 2, the override function of jog button JB is utilized to effect continuous activation of motorized sections 9 and 10, and simultaneous deactivation of motorized section 8, thus effectively overriding the time cycle which normally controls the duration of activation of motorized section 10. This is accomplished by manual depression of such jog button which closes contacts JB1 and JB2. The closing of contacts JB1 bypasses normally open contacts 11 PENO and normally closed contacts 9TDNC to energize motor controller coil 9M and independently maintain the activation of motorized section 9 for so long as the jog button is maintained in a depressed position. The closing of contacts JB2 bypasses normally closed contacts 11PENC to energize OFF DELAY time delay relay 9TD resulting in the activation of motorized section 10 and the deactivation of motorized section 8 in the manner described hereinabove. Such activation of motorized section 10 is similarly independent of the functioning of the remainder of the circuit and is also maintained for so long as the jog button is continued in a depressed position.

In the event that articles accumulate on gravity section 6 and back up to the extent that the beam of light from photo-electric sensing means 12 is interrupted for a predetermined period of time, normally open contacts 12PENO reshift and open, thus de-energizing motor controller coil 7M and normally open contacts 7MNO, and sequentially, motor controller coils 8M and 10M through ON DELAY time delay relay 8TD and normally open contacts 8TDNO, thus deactivating motorized sections 7, 8, and 10. Motorized section 9 remains activated, building up an accumulation of articles on gravity section 5. This, however, has no effect on the accumulation of articles on motorized section 7 or gravity section 6 because the motorized section 10 is deactivated and functions to halt any further flow of articles from gravity section 5.

As soon as the accumulation of articles has cleared gravity section 6 and the beam of light from sensing means 12 again becomes uninterrupted, the normally open contacts 12PENO again shift and close, thus reactivating motorized sections 7 and 8 to return the conveyor assembly to normal operation.

Various changes and modifications may obviously be made in the disclosed embodiments of my invention without departing from the spirit and scope thereof.

What is claimed is:

1. Apparatus for controlling the flow of articles from two conveyors which merge into a single conveyor wherein said two conveyors are active at different times to convey articles to said single conveyor, comprising a first sensing means associated with one of said two conveyors and operative to detect the formation of an accumulation of articles thereon and first control means responsive to such detection by said first sensing means first sensing means associated with one of said two conveyors active and the other inactive, and second sensing means associated with said single conveyor and operative to detect the formation of an accumulation of articles thereon and second control means responsive to such detection by said second sensing means and operative thereby to render said two conveyors inactive.

2. Apparatus for controlling the flow of articles from two conveyors which merge into a single conveyor wherein said two conveyors are active at different times to convey articles to said single conveyor, comprising a photoelectric detection station associated with one of said two conveyors and operative to detect the formation of an accumulation of articles thereon, and control means including a photoelectric relay, time delay relays, and motor controller coils connected thereto, said control means being responsive to such detection by said photoelectric detection station and operative thereby to render the one of said two conveyors active and the other inactive.

3. Apparatus as in claim 1 wherein the second sensing means comprises a photo-electric detection station and the control means comprise a photo-electric relay and time delay relays and a motor controller coil connected thereto.

4. Apparatus for controlling the flow of articles from first and second conveyors to a third conveyor and wherein the first conveyor is normally inactive and the second conveyor is normally active to convey articles to said third conveyor, comprising first and second motorized sections of the first conveyor and a third motorized section of the second conveyor, a first sensing means associated with the first conveyor and operative to detect the formation of an accumulation of articles thereon and control means responsive to such detection by the sensing means and operative thereby to render the second motorized section active and the third motorized section inactive thus rendering the first conveyor active and the second conveyor inactive to transport articles to the third conveyor.

5. Apparatus as in claim 4 further comprising a fourth motorized section at the junction of the first and second conveyors and the third conveyor, a second sensing means associated with said third conveyor and operative to detect the formation of an accumulation of articles thereon and control means responsive to such detection by the second sensing means and operative thereby to render said second, third and fourth motorized sections inactive, thus halting further flow of articles from the first and second conveyors to the third conveyor.

6. Apparatus as in claim 4 wherein the first sensing means comprises a first photo-electric detection station and the control means comprise a first photo-electric relay operatively connected to the first sensing means, first, second and third time delay relays connected to the photo-electric relay and first, second and third motor controller coils connected respectively to the time delay relays and operative upon energization and de-energization to activate and deactivate said motorized sections, whereby upon interruption of the beam of light from the photo-electric detection station by an accumulation of articles on the first conveyor, the first and third motor controller coils are de-energized, thus deactivating the first and third motorized sections and the second motor controller coil is energized, thus activating the second motorized section.

7. Apparatus as in claim 5 wherein the second sensing means comprises a photo-electric detection station and the control means comprise a second photo-electric relay connected thereto and a fourth motor controller coil connected to the photo-electric relay and operative upon energization and de-energization to activate and deactivate the fourth motorized section whereby upon interruption of the beam of light from the second sensing means by an accumulation of articles on the third conveyor the fourth motor controller coil is de-energized, thus deactivating the fourth motorized section.

8. Apparatus for controlling the flow of articles from a first and second conveyor which merge into a third conveyor and wherein said first conveyor is normally inactive and said second conveyor normally active to transport articles to said third conveyor, comprising a first sensing means associated with said first conveyor and operative to detect an accumulation of articles thereon and control means responsive to such detection by the sensing means and operative thereby to render the first conveyor active and the second conveyor inactive for a predetermined time sufficient to allow for the transportation of the accumulation of articles from the first conveyor to the third conveyor, and at the expiration of which to render the second conveyor active and the first conveyor inactive.

9. Apparatus for controlling the flow of articles from a first and second conveyor to a third conveyor wherein the first conveyor is normally inactive and the second conveyor normally active to transport articles to the third conveyor, comprising a first sensing means associated with said first conveyor and operative to detect an accumulation of articles thereon and first control means responsive to such detection by the sensing means and operative thereby to render the first conveyor active and the second conveyor inactive for a predetermined time sufficient to allow for the transportation of the accumulation of articles from the first conveyor to the third conveyor and at the expiration of which to render the second conveyor active and the first conveyor inactive, and a second sensing means associated with said third conveyor and operative to detect the formation of an accumulation of articles thereon and second control means responsive to such detection by said second sensing means, and operative thereby to render said first and second conveyors inactive until the accumulation of articles has cleared the third conveyor and to then render the second conveyor active.

10. Apparatus as in claim 9 further comprising an override means operative upon actuation to override the control means and render said first conveyor active and the said second conveyor inactive for so long as the override means is maintained in a state of actuation.

References Cited in the file of this patent

UNITED STATES PATENTS 2,978,092     Phillips et al. _____ Apr. 4, 1961